J. H. KNOLL.
BEARING FOR WASHING MACHINES.
APPLICATION FILED APR. 2, 1907.
905,711.
Patented Dec. 1, 1908.
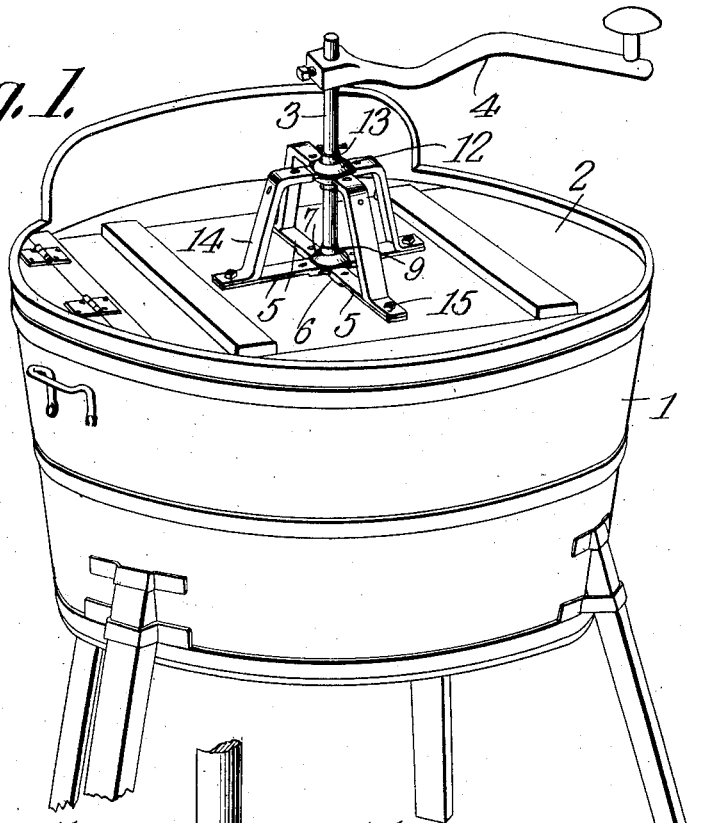
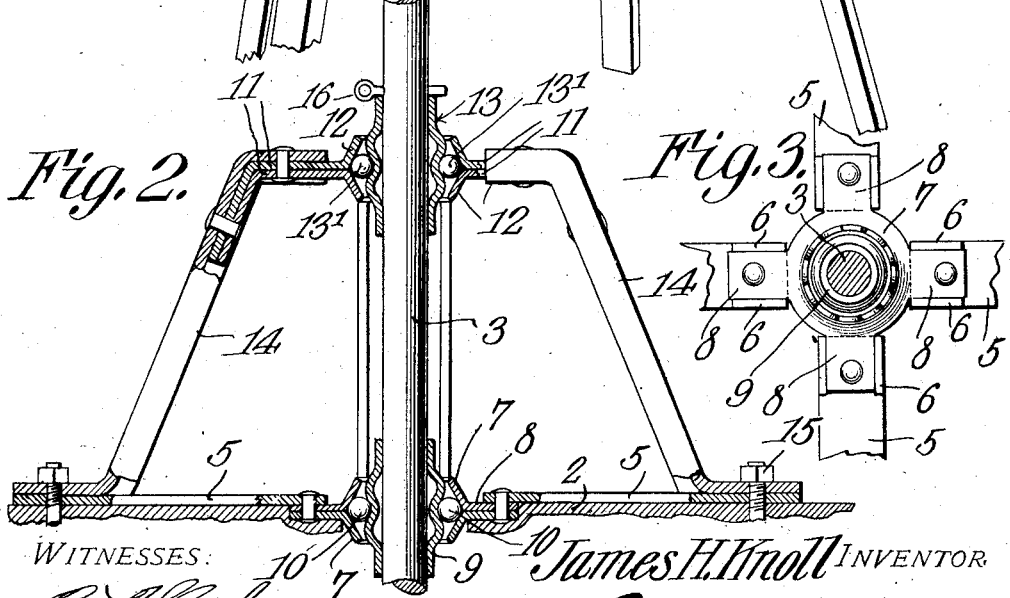
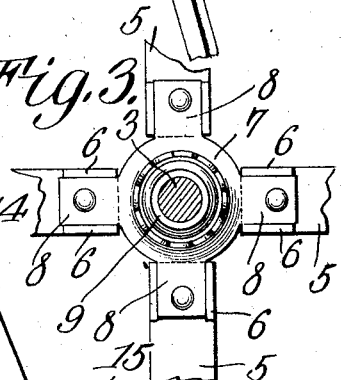
WITNESSES:
James H. Knoll INVENTOR
By C. A. Snow & Co.
ATTORNEYS

UNITED STATES PATENT OFFICE.

JAMES H. KNOLL, OF READING, PENNSYLVANIA.

BEARING FOR WASHING-MACHINES.

No. 905,711.  Specification of Letters Patent.  Patented Dec. 1, 1908.

Application filed April 2, 1907. Serial No. 365,959.

*To all whom it may concern:*

Be it known that I, JAMES H. KNOLL, a citizen of the United States, residing at Reading, in the county of Berks and State of Pennsylvania, have invented a new and useful Bearing for Washing-Machines, of which the following is a specification.

This invention has relation to bearings for washing machines and it consists in the novel construction and arrangement of its parts as hereinafter shown and described.

The object of the invention is to provide a bearing for washing machines, etc. which is of simple and cheap construction and of durable nature.

The bearing consists primarily of ball rings spaced apart and each receiving a sleeve having in its periphery a ball channel. Bearing balls are located between the rings and the sleeves. The longitudinally movable shaft passes through the said sleeve and is provided at one end with means for turning the same and is adapted to enter the body of the washer and carry a suitable dasher.

In the accompanying drawing:—Figure 1 is a perspective view of the washing machine. Fig. 2 is a vertical sectional view of the bearing support. Fig. 3 is a bottom plan view of the inner portion of the lower part of the bearing.

The character of machine upon which the bearing is usually employed comprises the body or tub 1 which is provided with the hinged top 2. The beater or dasher shaft 3 passes vertically through the top 2 and is provided at its upper end with the adjustable handle 4.

The ball bearing supports comprise the lower arms 5 which are attached to and rest directly upon the top of the cover 2. Each of the said arms 5 is provided at its inner end with the depending rectangular lugs 6. The rings 7, 7 are provided with the laterally disposed extensions 8 which are secured together and which are attached to the arms 5 between the lugs 6 thereof, the inner walls of the rings being oppositely flared to provide a ball race. The sleeve 9 is located within the rings 7 and the balls 10 are interposed between the ball race and an intermediate annular groove provided in the said sleeve whereby a ball-bearing is formed.

The rings 12, which also have their inner walls oppositely flared to provide a second ball race, are located vertically above the rings 7 and the sleeve 13, which is a counterpart of the sleeve 9, is located within the said rings 12. The balls 13' are interposed between the ball race formed by the rings 12 and the sleeve 13 and together with the retaining parts form a relatively elevated ball bearing. The rings 12 are provided with laterally-disposed extensions 11 which are riveted or otherwise secured between the side flanges of the upper ends of the legs 14 which are channeled, and have their terminals bent in opposite directions, the lower ends of the legs being secured to the outer ends of the arms 5 by bolts 15. The pin 16 passes transversely through the shaft 3 and may come in contact with the upper edge of the sleeve 13 and limit the downward movement of said shaft.

From the foregoing description it is obvious that by providing two ball bearings spaced apart a long anti-friction bearing is afforded for the shaft and consequently the shaft is retained in its proper vertical relation to the top 2. Also a very simple and durable bearing is afforded, one in which all of the parts coöperate to brace and strengthen the structure.

Having described my invention what I claim as new and desire to secure by Letters-Patent is:—

The combination with a support, of a plurality of arms secured thereto and provided at their inner ends with depending lugs, a pair of rings having extensions secured between the lugs, the inner walls of the rings being oppositely flared to provide a ball race, channeled legs having their terminals bent in opposite directions and secured to the support and to the arms, respectively, a second pair of rings spaced from the first pair and having extensions secured between the flanges of the upper ends of the legs, the inner walls of the rings being oppositely flared to provide a ball race, sleeves extending through the rings and having their intermediate portions depressed to provide ball races, bearing balls engaging the two sets of races, and a shaft passing loosely through the sleeves.

In testimony that I claim the foregoing as my own, I have hereto affixed my signature in the presence of two witnesses.

JAMES H. KNOLL.

Witnesses:
CAMERON E. STRAUSS,
E. CARROLL SCHAEFFER.